Aug. 28, 1962 C. D. VISOS 3,051,074
SEMI-AUTOMATIC TOASTER
Filed Nov. 10, 1958 3 Sheets-Sheet 1

INVENTOR.
CHARLES D. VISOS
BY
Bair, Freeman & Molinare
ATTYS.

Aug. 28, 1962

C. D. VISOS 3,051,074

SEMI-AUTOMATIC TOASTER

Filed Nov. 10, 1958

INVENTOR.
CHARLES D. VISOS
BY
Bair, Freeman & Molinare
ATTYS.

Aug. 28, 1962  C. D. VISOS  3,051,074
SEMI-AUTOMATIC TOASTER
Filed Nov. 10, 1958  3 Sheets-Sheet 3
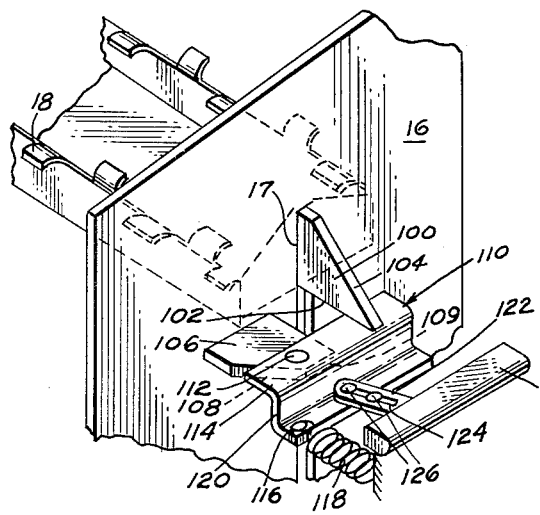
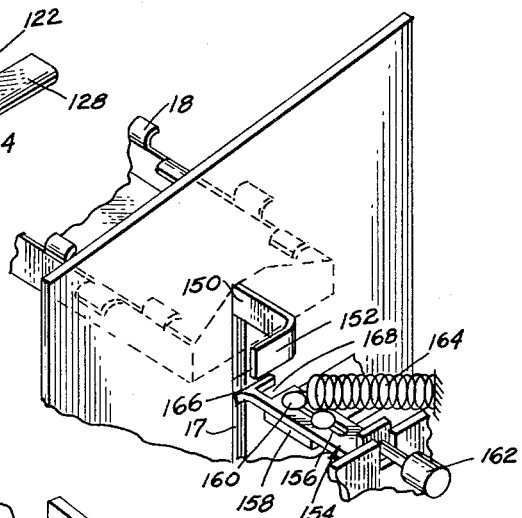
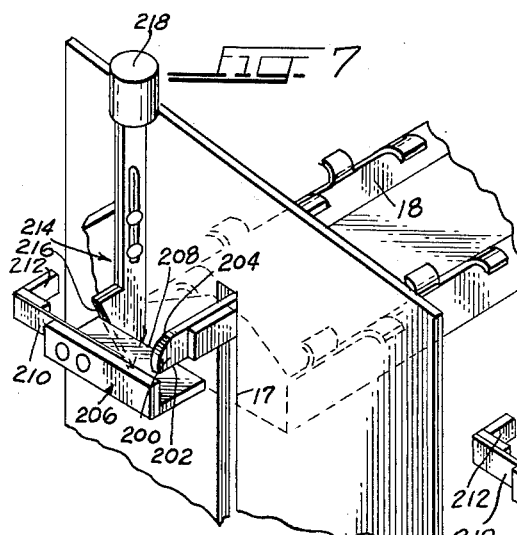
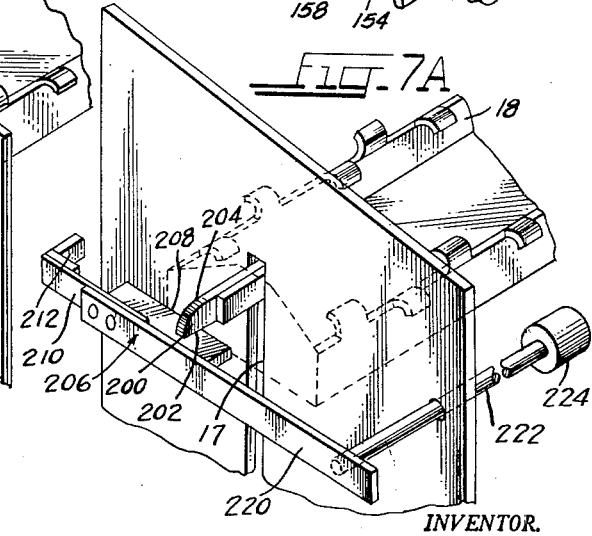
INVENTOR.
CHARLES D. VISOS
BY
Bair, Freeman & Molinare United States Patent Office 3,051,074
Patented Aug. 28, 1962

3,051,074
SEMI-AUTOMATIC TOASTER
Charles D. Visos, St. Louis, Mo., assignor to Knapp-Monarch Company, St. Louis, Mo., a corporation of Delaware
Filed Nov. 10, 1958, Ser. No. 772,897
6 Claims. (Cl. 99—329)

This invention relates to a toaster. More particularly, this invention relates to a toaster wherein the operation thereof is semi-automatic in that a manual control is provided for releasing the bread supporting carriage at the beginning of a toasting cycle, and wherein the operation of the bread toasting cycle is fully automatic thereafter.

The instant invention is, in part, an improvement over that disclosed in the co-pending application of Huck, Serial No. 460,052, filed October 4, 1954, assigned to the common assignee of this application, and now issued as Patent No. 2,863,377.

In the said co-pending application there is disclosed a toaster of the type wherein a movable bread carrier is included which is normally supported in an up position by cam means, and wherein the cam means are moved out of their carrier-supporting position through the medium of pressure on the bread carrier through the slice of bread positioned thereon, and thereafter, the carrier moves through its toasting cycle automatically by first moving to a lower toasting position, and after a toasting cycle has been automatically terminated by any appropriate timing means, an accelerating lift means is momentarily energized to initiate movement of the carriage toward its up position, and the inertia of the carriage moving upwardly operates to move the carriage past the cam restraint, to effect movement of the cam means to the latching position and to maintain the carriage in the up position pending the insertion of the new slice of bread into the toaster.

The device thus disclosed in the co-pending application has certain limitations in the requirement that the unlatching of the cam means, to initiate a toasting cycle, is dependent upon the pressure applied to the bread carriage through the bread slice.

Thus, it is an object of this invention to provide a toaster which operates automatically in the manner as disclosed in the co-pending application, but which is provided with a manually actuatable and manually releasable cam-type restraint which may be selectively manually actuated to initiate the toasting cycle, and which thereafter operates fully automatically to time out the toasting cycle and to return the bread supporting carriage to its initial position pending the initiation of a new cycle.

Another object of the present invention is to provide an improved semi-automatic bread toaster which is of simple, inexpensive and yet reliable construction and embodying features of construction, combination and arrangement which render it particularly suitable for domestic use.

Simply stated, the invention herein contemplates a simplified toaster which has a movable bread carrier therein for movement between up and down positions, and wherein a simple, manually releasable, latch maintains the carriage in the up position, so that upon release of said latch means the carriage moves under gravity to the down position, and wherein there are provided toasting means and timing means which operate while the carriage is in down position until the timer terminates the end of a toasting cycle, at which point a motor means, which requires no potentialization during the movement of the carriage to down position, is operated to effect movement of the carriage to the up position where it is automatically latched by the latch means preparatory to initiating of another toasting cycle.

These and other objects will become apparent from the following description when read in conjunction with the accompanying drawings, in which:

FIGURE 5 is a perspective fragmentary view similar to a part of FIGURE 2, showing a modified form of manual release for effecting release of the carriage to permit the carriage to move down to a toasting position;

FIGURE 6 is a fragmentary perspective view similar to FIGURE 5 showing another form of manual release; and FIGURE 7 is a fragmentary perspective view similar to FIGURES 5 and 6 showing still another form of manual release.

FIG. 7A is a fragmentary perspective view showing still another form of manual release.

Figure 1:
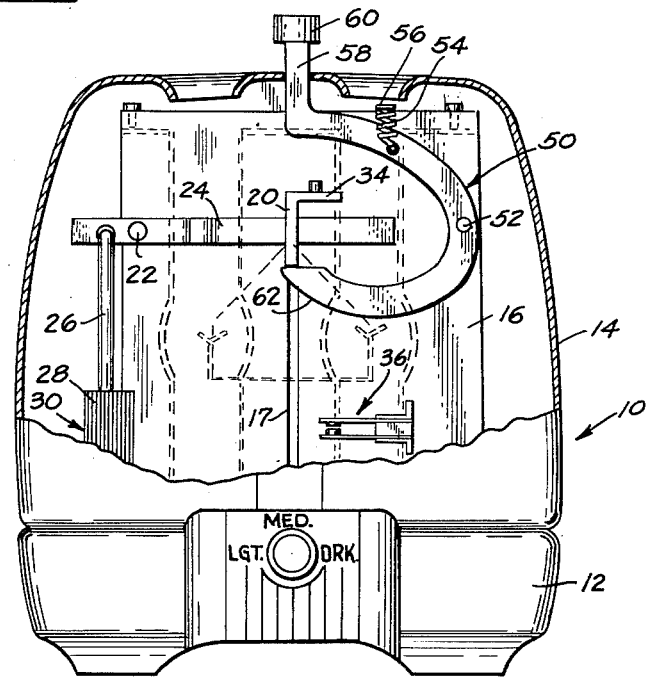
FIGURE 1 is a end elevation view with parts broken away illustrating certain portions of a toaster embodying the present invention.

Referring now to the figures, the toaster is generally indicated as 10, and includes a base 12 and an upper sheet metal casing 14 which encloses the bread carriage and other portions of the toaster. Positioned within the casing 14 is an end panel 16, to one side of which is located the toasting elements and the toasting chambers within which bread is positioned for toasting, and to the other side of which is located certain operating elements and mechanisms of the toaster, in a manner as is well known in the art.

The foregoing structure, including the casing and the end panel 16, is stationary structure, in contrast with the movable bread carrier within the toaster which moves up and down relative to said stationary structure. The movable bread carrier is indicated at 18 and has a control portion 20 connected thereto and movable therewith. The control portion 20 of the bread carrier projects outwardly of end panel 16 through an elongated, vertical, track-like slot 17 in end panel 16, the edges of which slot 17 cooperate with the sides of an extension of control portion 20 to restrict movement of carrier 18 along the pre-selected path, and said control portion 20 is disposed on the control side of end panel 16, while the remainder of the bread carrier 18 is disposed to the other side of panel 16 and within the toasting chambers.

Pivotally mounted on panel 16, by means of pin 22, is an elongated arm 24, one end of which is operatively engaged with the control portion 20 of the bread carrier. The other end of arm 24 is connected by means of a link 26 to a plunger portion 28 of a solenoid motor generally indicated at 30. The control portion 20 of the bread carrier 18 has an elongated cut out 32 through which the end of arm 20 extends and by means of which there is provided an operative connection between the bread carrier 18 and the arm 24. The control portion 20 also has a laterally extending flange portion 34.

Figure 3:
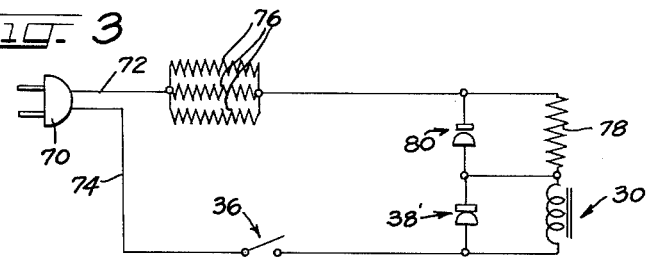
FIGURE 3 is a schematic diagram of one type of circuit for the toaster of FIGURES 1 and 2.
Figure 4:
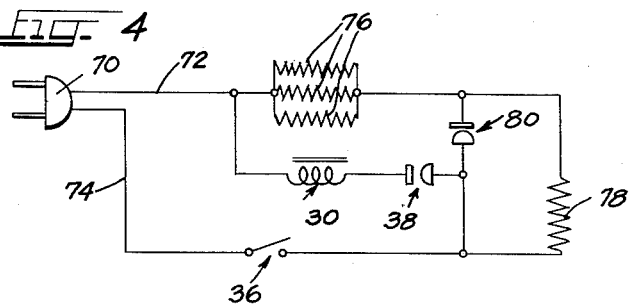
FIGURE 4 is a schematic circuit diagram of a modified form of circuit for the toaster of FIGURES 1 and 2.
Figure 2:
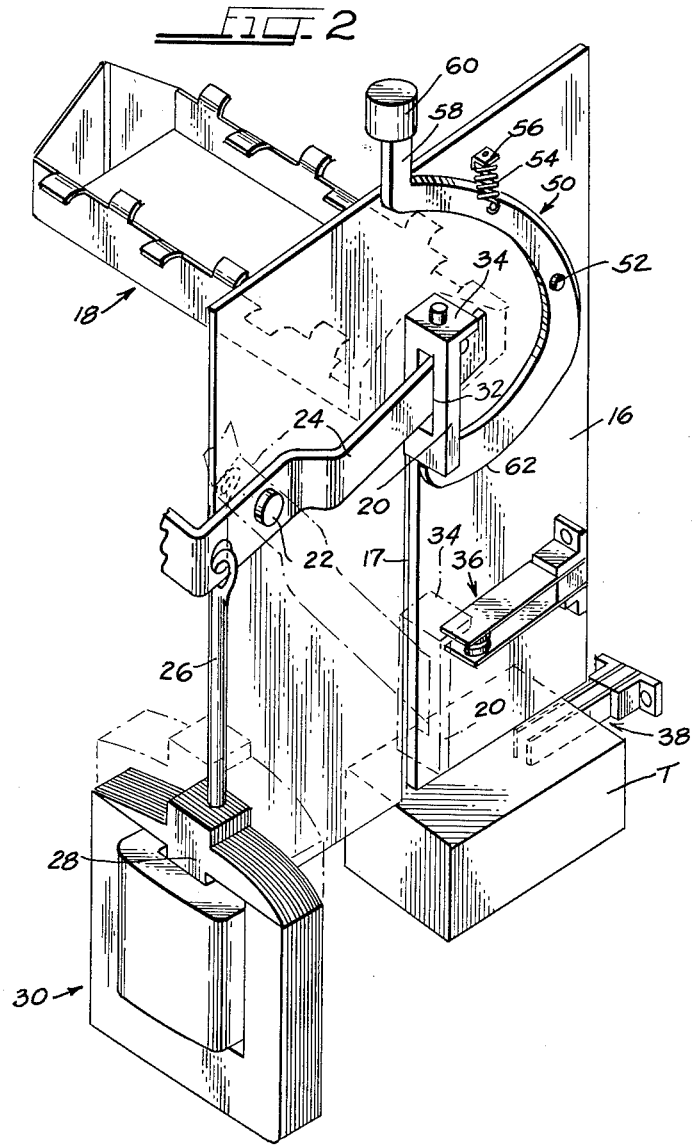
FIGURE 2 is an enlarged, perspective, fragmentary view illustrating portions of a toaster embodying the invention, and particularly illustrating the manual control for effecting release of the carriage to initiate a toasting cycle.

Positioned across the path of movement of the flange 34 is a normally open switch, generally indicated at 36, and the cooperation of flange 34 and switch 36 is such that when bread carriage 18 moves to its lowermost position, shown in dot-and-dash lines in FIGURE 2, the flange 34 deflects the upper switch blade of switch 36 and operates to close the switch 36 to initiate the energization of the heater elements and so as to initiate the toasting cycle. A toasting-cycle-timing means, generally indicated at T, is also positioned in the toaster, and, as well known in the art, the timing means T operates not only to time the energization of the heater elements, but also serves thereafter to terminate the toaster-heating-cycle. The timing means T may be of any well-known construction, but as designated in FIGURES 3 and 4 is preferably a thermal-type timer.

In the process of terminating the toasting cycle, the timer means T is caused to close a switch generally indicated at 38, and this operates to energize the solenoid 30 which causes sudden downward movement of the solenoid plunger 28 and accompanying upward movement of the bread carriage 18. The upward movement of the bread carriage 18 operates to effect reopening of the main switch 36, which in turn effects the de-energization of the solenoid 30. However, before solenoid 30 is de-energized, the magnetic force from the coil of solenoid 30 has been sufficient to effect accelerating movement of the solenoid plunger 28 downwardly and of the bread carrier 18 upwardly, so that the bread carrier 18 will have sufficient inertia, after de-energization of the coil of solenoid 30, to move sufficiently high to effect the carriage control portion 20 being engaged and secured in the "up" position, to thereby terminate the full toasting cycle, and to thereby position the bread carrier 18 for the receipt thereon of a fresh slice of bread and for the beginning of a new toasting cycle.

The foregoing construction is substantially similar to that disclosed and claimed in the said pending Huck application, Serial No. 460,052. The improvement in the instant invention over the co-pending Huck application will now be described.

In order to maintain the bread carrier 18 in the raised position, there is provided the generally U-shaped latch arm 50 which is pivoted on a pin 52 carried by panel 16. The pivot pin is connected to the U-shaped lever arm 50 substantially at the mid-point of the bight of the U, and the lower portion of the U is arranged to engage the under edge of the control portion 20 of the bread carriage 18 in the manner shown in FIGURES 1 and 2, to support the bread carriage 18 in the "up" position. The U-shaped arm 50 is normally maintained in the position shown in FIGURES 1 and 2 by means of a spring 54 which connects at one end to the upper portion of arm 50 and at its other end to an abutment 56 on the end panel 16.

The upper portion of the U-shaped arm 50 has an upwardly extending portion 58 which extends above panel 16 and outwardly of the toaster casing 14 and is provided with a manually engageable control button 60 at the upper terminus thereof. By swinging of the control button 60 to the left as viewed in FIGURES 1 and 2, the lower portion of the U-shaped arm is swung away from its holding position, as seen in said FIGURES 1 and 2, and the bread carrier 18 will begin to move to the "down" position at the same time moving solenoid plunger 28 away from the coil of solenoid 30. Thereafter, upon release of the control button 60, the spring 54 operates to swing the U-shaped arm 50 back to its initial condition, wherein the extended end of the lower portion of the U-shaped arm 50 is positioned across the path of upward movement of the actuator 20 from its lower position to its upper position.

The under edge of the lower portion of the U-shaped member 50 is shaped to provide a cam edge 62 thereat so that when the bread carriage 18 moves towards its "up" position, the actuator 20 will engage the cam 62 and will automatically cause pivoting of the U-shaped latch 50 against the bias of spring 54 and with respect to the pivot pin 52, and out of the path of movement of the control portion 20, thereby permitting the bread carriage 18 to rise to its uppermost position where it clears the lower portion of the U-shaped latch member 50, and the spring 54 then operates automatically to swing the lower portion of the U-shaped latch member 50 back to its latching position as shown in FIGURES 1 and 2, thereby resetting the entire mechanism preparatory to initiating a new cycle.

The basic elements in the circuit for a toaster as herein described are shown in two arrangements illustrated in FIGURES 3 and 4. In FIGURE 3 there is shown a service plug 70 with electrical leads 72 and 74 extending therefrom. The toaster heating elements are 76 and the main switch 36, when closed, completes the circuit through toaster heating elements 76. The circuit also includes a bimetal heater 78 which is part of the timer means T, and a normally closed shunting switch 38'. The timer means T is of the well-known type which operates through means (not shown) to effect opening of switch 38' in response to heater 78 to initiate termination of a toasting cycle. Upon switch 38' being opened, the entire line current passes through solenoid coil 30 to cause operative energization thereof, and the toasting cycle is then terminated as described hereinabove. FIGURE 3 also shows the use of a heat-up-limit switch 80 in the circuit which is normally open but operates to close just prior to the end of the toasting cycle so as to shunt and de-energize the bimetal heater 78. Neither the details of the time T nor the use of switch 80 constitute a part of this invention but are referred to in order to disclose an operative system.

In FIGURE 4, the solenoid coil 30 is connected across the heating elements 76. In this form, the switch 38 is normally open and hence coil 30 is de-energized. The heater 78 of timer means T operates to effect closure of switch 38 at a selected time, and this energizes coil 30 to effect movement of the bread carriage to effect termination of a toasting cycle.

Thus, it can be seen that there has been provided a manual control in a semi-automatic toaster such that by actuation of only the manual control, the bread carriage is released to initiate the beginning of a fully automatic toasting cycle, and the carriage then moves downward to its toasting position in which the heaters of the toasting circuit are energized, and thereafter the timing means of the toasting means terminates a toasting cycle, after which the bread carriage is actuated upwardly automatically to move towards its sustained lifted position, and during its upward travel, the bread carriage operates to automatically actuate the latching means to permit the bread carrier to be latched in its lifted position, and the latch means operates automatically to restrain the carrier in the up position preparatory to the initiation to a new toasting cycle.

FIGURES 5, 6, and 7 illustrate three other forms of manual release for effecting release of the carriage to permit the bread carriage to move down to a toasting position. Parts which are similar to those shown in FIGURE 2 are similarly numbered. In FIGURE 5 the bread carriage 18 provides a control portion 100 which extends outwardly of end panel 16 through the slot 17 in said panel 16. The control portion 100 is provided with a horizontal lower edge 102 and a sloping cam edge 104. The end panel 16 carries an outwardly extending flange 106 with a beveled edge 108 and an abutment edge 109, and which flange 106 has a latch member 110 pivotally mounted thereon by means of pivot pin 112. The latch member 110 has an upper horizontal portion 114 which is adapted to engage control portion 100, a lower horizontal portion 116 to which spring means 118 are connected for normally biasing latch member 110 to the latching position shown in FIGURE 5, and a vertical portion 120 against which an actuator 122 is adapted to press to permit of manual actuation of the latch member 110 to an unlatching position. The actuator 122 is slotted at 124 for cooperative engagement with appropriately supported headed pins 126 which restrict movement of actuator 122 to reciprocal directions, and the outer end of actuator 122 carries a handle 128 which is normally disposed outwardly of the toaster's casing.

It will be evident that pushing handle 128 in the direction toward latch member 110 effects pivoting of member 110 against the bias of spring 118 to a position wherein control 100 is released, thereby permitting the carriage 18 to lower. When handle 128 is released, the handle 128 is restored by member 110 under bias of spring 118 to its normal position with part 120 abutting edge 109. When the carriage 18 rises, the cam edge 104 displaces latch member 110 until control portion 100 is disposed above latch 110, thereby permitting automatic re-latching of carriage 18 in the elevated position.

In FIGURE 6, the carriage 18 has an outwardly extending control 150 with a hook end 152. The latch member 154 is an elongated bar having an elongated slot 156. The latch member 154 is supported on a frame member 158 which carries a pair of headed pins 160 whose shanks extend through slot 156 to effect restriction of movement of member 154 in only reciprocal directions. The latch has a manual control button 162 extending outwardly of toaster casing 14. A spring 164 normally biases latch 154 to the position of FIGURE 6. The extended end of latch 154 is bent downwardly at 166 thereby providing an under surface which is inclined to the horizontal and a cutout 168 is provided outwardly of portion 166. When in the position of FIGURE 6, the hook end 152 engages the upper surface of portion 166 to maintain carriage 18 in elevated position. When button 162 is pushed inwardly, the hook end 152 registers with cutout 168 and the carriage is released for movement down to a toasting position. Release of button 162 restores latch 154 to the FIGURE 6 position. When carriage 18 rises, the upper edge of hook end 152 engages the sloping underside of portion 166 and cams latch 154 inwardly to permit upward movement of hook end 152 through cutout 168, whereupon spring 164 automatically restores latch 154 to the FIGURE 6 position. Rearward movement of latch 154 under bias of spring 164 may be limited either by length of slot 156 cooperating with pins 160 or by abutment of portion of latch 154 with toatser casing 14.

In FIGURE 7, the carriage 18 has an outwardly extending control 200, with a flat latching edge 202 and a cam edge 204. A latch member 206 having an elongated cam-engaging edge 208 is carried on a leaf spring 210 which is appropriately mounted on frame portion 212. Leaf spring 210 normally maintains latch 206 in the FIGURE 7 position. A latch actuator 214 with a sloped edge 216 for engagement with edge 208 is arranged for reciprocal vertical movement, and has a control button 218 adapted to extend outwardly of a toaster casing. By pushing down on button 218, the latch 206 is swung away from latching engagement with control 200, thereby permitting carriage 18 to lower to a toasting position. When button 218 is released, spring 210 restores latch 206 to the FIGURE 7 position. When carriage 18 rises, cam edge 204 engaging edge 208 displaces latch 206 until control 200 moves above edge 208, whereupon all the parts are automatically restored to the FIGURE 7 position.

An alternate construction is shown in broken lines in FIGURE 7 wherein latch 206 is provided with an extension 220 and a headed push rod 222, which is carried by the toaster frame, is arranged to engage extension 220 to effect release of carriage 18. This alternate construction permits positioning the control button 224 on the side of the toaster opposite and remote from the location of the latching mechanism.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An automatic toaster comprising, in combination, stationary structure defining a toasting chamber, a movable bread carrier in said toasting chamber having a control portion thereon extending outwardly of said toasting chamber, bread-toasting means in said toasting chamber, movable latch means carried by said stationary structure and positioned to directly engage said control portion for maintaining the bread carrier with bread loaded thereon in raised condition, casing means for said toaster and normally restricting access to said control portion, a manual control extending outwardly of said casing means for selectively moving said latch means out of a latching position to permit the bread carrier with bread loaded thereon to fall freely under gravity away from said movable latch means to a lowered bread-toasting position, switch elements normally resiliently biased to an open condition connected in circuit with the toasting means, means carried by said bread carrier and positioned to engage and move against the resilient bias of the normally open switch elements to close said switch means only when the bread carrier is in lowered bread-toasting position to initiate a toasting operation, and toasting-cycle-terminating means operable to energize a motor through said closed switch means to thereby initiate raising the bread carrier upon completion of the toasting operation.

2. An automatic toaster comprising, in combination, stationary structure defining a toasting chamber, a movable bread carrier in said toasting chamber having a control portion extending outwardly of said toasting chamber, bread-toasting means in said toasting chamber, elongated lever arm means pivoted intermediate its ends to the stationary structure outside of said toasting chamber and to one side of said control portion, one end of said arm means being operatively connected with said carrier through said control portion and the other end of said arm being connected to motor means, a normally open switch in circuit with said bread toasting means and positioned to be closed by the control portion of said bread carrier when the bread carrier is down in toasting position, toasting-cycle-terminating means operable to energize said motor and to move said bread carriage through said lever arm to up position upon completion of the toasting operation, a latch member pivoted to said stationary structure to the other side of said control portion and extending across the path of movement of said control portion and engaging said control portion for sustaining the bread carrier in up position, resilient means normally biasing the latch member toward said bread carrier sustaining position, a manual control on said latch member for selectively pivoting the latch member against said resilient bias out of carrier sustaining engagement with said control portion, said latch member being shaped to present a cam edge extending across the path of movement of said bread carrier toward said up position, so that the upwardly moving bread carrier will engage said cam edge and automatically move said latch member, against the resilient bias, out of the path of movement of said carrier, and said resiliently biased latch member then operating to automatically latch said carrier in up position after the carrier has cleared said cam edge.

3. In an automatic toaster of the type having stationary structure, a movable bread carrier, and bread-toasting means, the improvement comprising: a latch member movably mounted on said stationary structure and resiliently biased toward a latching position in direct engagement with a portion of said bread carrier for maintaining said bread carrier with bread loaded thereon in up position, a manual control for selectively moving the latch member away from said latching position to release said bread carrier with bread loaded thereon from up position and permitting the carrier to move away from said latch member down to a toasting position; accelerating lift means including lever arm means engageable with said bread carrier and operable when energized momentarily to initiate movement of the bread carrier toward latching relationship with said latch member, where the carrier is sustained in up position, said accelerating lift means being de-energized before said carrier moves adjacent to into the up position; means including the inertia of the carrier, after the lift means has been de-energized, to effect movement of the carrier upwardly until the carrier moves into said sustained lifted position; normally open switch elements connected in circuit with the bread-toasting means and spaced below the carriage when the carriage is in its up position and positioned adjacent the carriage when the carriage is in its lowered position; means carried by the bread carrier and positioned to engage and close said open switch elements only when the bread carrier is in lowered position to initiate a toasting operation; and toasting-cycle-terminating means operable to energize the lift means through said closed switch elements and to thereby initiate raising the bread carrier upon completion of the toasting operation, whereupon the switch elements will open after the lift means have been only momentarily energized and before the carriage has moved upwardly to a position adjacent its up position.

4. In an automatic toaster of the type having stationary structure, toasting means therein, and movable structure including a movable bread carrier and a control portion extending from said carrier and movable therewith, a motor, and lever arm means separate from said bread carrier and control portion thereof for transmitting movement of the motor to said bread carrier; the improvement comprising, in combination, a movably mounted latch member carried on said stationary structure for directly engaging a portion of said movable bread carrier to normally maintain the bread carrier with bread loaded thereon in a raised position, a manual control for selectively moving said latch member out of latching position to permit the bread carrier with bread loaded thereon to move by gravity away from said latch member to a lowered, bread-toasting, position, normally open switch elements connected in circuit with the toasting means and positioned below and across the path of movement of said control portion, means including said control portion positioned to engage and close said switch means only when the bread carrier is in lowered, bread-toasting position to initiate a toasting operation, toasting-cycle-terminating means operable to energize the motor through said closed switch elements and to thereby initiate raising the bread carrier by said lever arm means upon completion of the toasting operation, and said latch member being movable automatically, during upward movement of said bread carrier, into position of latching engagement with said control portion of said movable bread carrier, to maintain the bread carrier in a raised position.

5. In an automatic toaster of the type having stationary structure, toasting means therein, and movable structure including a movable bread carrier and a control portion extending from said carrier and movable therewith, a motor, and lever arm means separate from said bread carrier and control portion thereof for transmitting movement of the motor to said bread carrier, the improvement comprising, in combination, a movably mounted latch member carried on said stationary structure for directly engaging a portion of said movable bread carrier to normally maintain the bread carrier with bread loaded thereon in a raised position, a manual control for selectively moving said latch member out of latching position to permit the bread carrier with bread loaded thereon to move away from said latch member to a lowered, bread-toasting, position; normally open switch elements connected in circuit with the toasting means and positioned below and across the path of movement of said control portion, means including said control portion positioned to engage and close said switch means only when the bread carrier is in lowered, bread-toasting position to initiate a toasting operation; toasting-cycle-terminating means operable to energize the motor through said closed switch elements and to thereby initiate raising the bread carrier by said lever arm means upon completion of the toasting operation; bias means normally biasing said latch member toward its latching position, said latch member presenting a cam edge extending across the path of movement of said control portion of said movable bread carrier, so that the upward movement of the bread carrier under the influence of said motor means will automatically effect displacement of said latch member against the bias of said bias means, whereby upon the bread carrier reaching its raised position the bias means automatically biases the latch member to its normal position of latching engagement with said control portion of said movable bread carrier to maintain the bread carrier in its raised position.

6. An automatic toaster comprising, in combination, stationary structure defining a toasting chamber and toaster casing means, a movable bread carrier in said toasting chamber having a control portion thereon extending outwardly of said toasting chamber and within said casing means, bread-toasting means in said toasting chamber, elongated lever arm means pivoted to the stationary structure outside of said toasting chamber and to one side of said control portion, one portion of said arm means being operatively connected with said carrier through said control portion and another portion of said arm being connected to motor means, a normally open switch in circuit with bread-toasting means and positioned to be closed by said control portion of said bread carrier only when the bread carrier is down in toasting position, toasting-cycle-terminating means operable to energize said motor through said closed switch to move said bread carrier through said lever arm means to up position upon completion of the toasting operation, movable latch means positioned to engage said control portion on said bread carrier for maintaining the bread carrier in raised position, and a manual control projecting outwardly of the toaster casing means and being attached to said movable latch means, so that actuation of said manual control operates to selectively move said latch means out of a latching position to permit the bread carrier to move to said toasting position.

References Cited in the file of this patent

UNITED STATES PATENTS

| | | |
|---|---|---|
| 2,378,073 | Felver | June 12, 1945 |
| 2,750,874 | Ireland | June 19, 1956 |
| 2,857,838 | Palmer | Oct. 28, 1958 |
| 2,863,377 | Huck | Dec. 9, 1958 |